United States Patent
Chao et al.

(10) Patent No.: US 9,661,112 B2
(45) Date of Patent: May 23, 2017

(54) SYSTEM AND METHODS FOR PROVIDING SERVER VIRTUALIZATION ASSISTANCE

(75) Inventors: Tienwei Chao, San Jose, CA (US); Vijoy Pandey, San Jose, CA (US); Wang Yao, Santa Clara, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 2146 days.

(21) Appl. No.: 12/070,985

(22) Filed: Feb. 21, 2008

(65) Prior Publication Data

US 2008/0205377 A1 Aug. 28, 2008

Related U.S. Application Data

(60) Provisional application No. 60/903,098, filed on Feb. 22, 2007.

(51) Int. Cl.

| | |
|---|---|
| *H04L 12/28* | (2006.01) |
| *H04L 29/14* | (2006.01) |
| *H04L 12/24* | (2006.01) |
| *H04L 12/947* | (2013.01) |
| *H04L 12/939* | (2013.01) |
| *H04L 29/08* | (2006.01) |

(52) U.S. Cl.
CPC .......... *H04L 69/40* (2013.01); *H04L 41/0213* (2013.01); *H04L 49/25* (2013.01); *H04L 49/557* (2013.01); *H04L 67/1002* (2013.01); *H04L 67/1008* (2013.01); *H04L 67/1027* (2013.01)

(58) Field of Classification Search
CPC ......... H04L 45/28; H04L 45/22; H04L 65/80; H04L 12/5695; H04L 47/12; H04L 43/00; H04L 41/5003; H04L 41/0668; H04L 45/70; H04L 47/70; H04L 47/728; H04L 47/805; H04L 49/25; H04L 41/02
USPC ................................. 370/351–356
See application file for complete search history.

(56) References Cited

U.S. PATENT DOCUMENTS

| | | | | |
|---|---|---|---|---|
| 6,728,748 | B1 * | 4/2004 | Mangipudi | H04L 69/329 709/226 |
| 7,602,774 | B1 * | 10/2009 | Sundaresan | H04L 47/805 370/381 |
| 2002/0124107 | A1 | 9/2002 | Goodwin | |
| 2005/0114490 | A1 | 5/2005 | Redlich et al. | |

(Continued)

OTHER PUBLICATIONS

International Search Report & Written Opinion in counterpart International Patent Application No. PCT/US08/54770, mailed on Jun. 27, 2008; 6 pages.

*Primary Examiner* — Melanie Jagannathan
*Assistant Examiner* — Najeebuddin Ansari
(74) *Attorney, Agent, or Firm* — Schmeiser, Olsen & Watts LLP

(57) ABSTRACT

An improved system and method for network switching that provides the ability to automatically and seamlessly migrate policies for network hosts under certain conditions to local or remote switch ports. The improved switch automatically migrates switch policies for virtual and physical hosts from a source port to a destination port when hosts have been physically moved or replaced. For elements that have failed, the improved switch also migrates host network policies for both physical hosts and virtual machines when the old host network policy will maintain serviceability of the element when applied to the new port.

7 Claims, 7 Drawing Sheets

(56) References Cited

U.S. PATENT DOCUMENTS

| | | | |
|---|---|---|---|
| 2006/0036733 A1* | 2/2006 | Fujimoto | H04L 61/2015 709/225 |
| 2006/0059540 A1* | 3/2006 | Hammons | H04L 63/101 726/2 |
| 2006/0233106 A1* | 10/2006 | Achlioptas et al. | 370/235 |
| 2006/0274774 A1* | 12/2006 | Srinivasan et al. | 370/420 |
| 2007/0027973 A1 | 2/2007 | Stein et al. | |
| 2007/0088974 A1* | 4/2007 | Chandwani et al. | 714/6 |
| 2007/0147419 A1* | 6/2007 | Tsujimoto | H04L 41/0226 370/466 |
| 2007/0180493 A1* | 8/2007 | Croft | G06F 3/1415 726/2 |
| 2008/0059745 A1* | 3/2008 | Tsukada et al. | 711/165 |
| 2008/0126836 A1* | 5/2008 | DiZoglio | G06F 11/0727 714/4.1 |
| 2008/0178202 A1* | 7/2008 | Blackman | G06F 13/385 719/327 |
| 2008/0189769 A1* | 8/2008 | Casado | G06F 21/6281 726/4 |

* cited by examiner

SYSTEM AND METHODS FOR PROVIDING SERVER VIRTUALIZATION ASSISTANCE

CROSS-REFERENCES TO RELATED APPLICATIONS

This application claims the benefit of U.S. Provisional Application Ser. No. 60/903,098, filed 22 Feb. 2007, the disclosure of which is incorporated herein by reference in its entirety.

STATEMENT AS TO RIGHTS TO INVENTIONS MADE UNDER FEDERALLY SPONSORED RESEARCH OR DEVELOPMENT

Not Applicable

REFERENCE TO A "SEQUENCE LISTING," A TABLE, OR A COMPUTER PROGRAM LISTING APPENDIX SUBMITTED ON A COMPACT DISK.

Not Applicable

BACKGROUND OF THE INVENTION

The present invention relates generally to computer processing systems, servers and network operations. More specifically, it relates to computer network communications systems such as switches and to an automated system and method for reducing downtime of a computer server in a server farm using network switches.

Computer networks are used to interconnect many computing resources, such as computers, servers, printers, modems, and storage devices. Two or more computers may be connected together through a network where each computer is located in a different facility or even in different parts of the world. Network users may share files, run applications and access remote computers over these networks. These networks are dependent upon elements such as network communication devices used to interconnect the computing elements. The elements are identified by certain unique identifiers such as an Internet protocol (IP) address, or a hardware-specific media access control (MAC) address.

Conventionally, a network communications device used to interconnect multiple computing resources is a chassis-based system designed to accommodate a number of internal cards (often called blades). The computing resources such as host computers are coupled to the internal cards of the chassis-based system, which further couples them to one or more networks. These chassis-based systems allow for additional internal cards to accommodate network growth. Often the "blades" are complete computers configured as servers for providing computing resources to other computers on the network.

A network switch is a networking device that performs transparent bridging for connecting multiple network segments with forwarding based on MAC addresses. Conventional switches can connect at 10, 100, or 1000 megabits per second, at either half or full duplex. The use of specially designed expansion also makes it possible to have large numbers of connections utilizing different mediums of networking, including but not limited to standards such as Ethernet, Fibre Channel, ATM and 802.11. Computing service providers will often use one or more network switches to route electronic signals to a plurality of different computing devices such as host computers or servers positioned in a server farm. The electronic signals (or traffic) are in the form of packets of data, each having unique identification for addressing the packet.

The routing of digital traffic can be represented by two distinct operational areas in a switch, called the control plane and the data plane. The control plane comprises a processor and associated memory and communications devices for managing the operations of the communications device. The control plane operates to determine the location of each IP address in a network and to direct the traffic to the identified location. Likewise, a data plane operates to manage the physical operations required to actually forward the information packet to the next location. This entails storing the packet in memory while control plane information is determined, placing the appropriate physical addressing and encapsulation on the packet frame, and then forwarding the packet to the appropriate location.

The control plane incorporates the software features for data flow management on the data plane, and the storage of settings and configurations for operation of the switch. If a host moves from one port to another port, the event triggers the Dynamic Switch Policy of the currently described invention such that the switch detects the change in the server farm. A failed host is differentiated from one that is pulled out and then later put in another slot based on user configuration on the switch—i.e., whether the intent of the user is to keep the policy attached to the particular server slot, or whether the intent is to move the policy to a different slot.

Conventional network switches provide communications protocols for ensuring that network traffic in server farms is directed to the proper computing resources by identifying and tracking IP and MAC addresses as well as other information. A Dynamic Host Configuration Protocol (DHCP) lets a network administrator supervise and distribute IP addresses from a central point, and sends a new address when a computer is plugged into a different place in the network. The DHCP relay agent information option (option 82) enables a DHCP relay agent to include information about itself when forwarding client-originated DHCP packets to a DHCP server. Thus, the DHCP server is a medium for communications between elements of a network.

Network switches are governed by switch policies that configure them to perform in a predetermined manner according to the features of a given switch. Examples of features include, but are not limited to, quality of access (QoA) level, quality of service (QoS) level, an access control list (ACL), one or more virtual local area networks (VLAN), Multi-Link Trunk and other features associated with switch operations. The switch policy may also not be configured for a port, which in effect, is a null policy.

Networks must also distinguish which physical computing resources are operating in specific networks. The physical layer may be controlled by an Element Management Systems (EMS) hosted on a network element such as a server or host computer, which resides in a managed network and operates with a simple network management protocol or other TCP/IP protocol. The protocols employed are used to indicate important network events to a management layer such as EMS. Network elements may also provide other services to a network operator, such as ATM or Frame Relay virtual circuits. Network elements are not limited to servers, but include all physical devices attached to or connected to one or more differing network elements.

Conventional Virtual Local Area Networks (VLANs) offer a method of dividing one physical network into multiple broadcast domains. VLAN-enabled switches are used to forward traffic to different computing devices. As an example, if a first host needs to communicate with a second host, it first sends an address resolution protocol (ARP) frame with the second host's destination IP address and a broadcast MAC address. The switch forwards this broadcast to all other ports in VLAN. The second host will send an ARP response frame with its own MAC address as the destination MAC address that the first host should use. All subsequent traffic will include frames with the second host's address, thus enabling communication at the physical layer.

Currently, when there is a system failure or when computing resources need to be moved from one network communications physical position to another, conventional means do not provide a way to automatically change IP, MAC and other switching information. Thus network managers must run configuration software or provide other means to correctly address a computing element. This results in unacceptable downtime for the computing network. As such, what is needed is an automated system and method for configuring computer communications systems. For instance, in a server farm including switches, after the initial setup of the system as a whole, some networking related events occur in the server farm that may result in an extended period of time for the server farm to be out of service. Therefore, the stability and serviceability of the network is jeopardized. The server virtualization assistance system and method disclosed herein provides solutions to these issues.

There are four possible outcomes when moving either a physical host or a virtual machine (VM) within the system, often called a Host ID Move, wherein a host is moved from one port to another. The first possible outcome is to keep the old host network policy while migrating the switch policy from the old port to the new port. For example, in a server virtualization deployment such as VMWARE ESX, one or multiple VMs can run on top of one VMWARE ESX Server, which abstracts the physical server. The VM can dynamically move from one physical server to another physical server. Consequently, the host id of the VM is also perceived as moving from one port to another port.

In this case, host migration happens automatically in the server farm, and if the administrator wants to keep the switch policy to the host no matter where it moves, he must manually reconfigure the switch, as switch technology today does not detect the Host migration or do anything regarding policy changes automatically. This manual reconfiguration results in longer downtimes. To illustrate the downtime required, consider a host that connects to a port of a switch with a VLAN. When the automatic VM migration occurs, the VM moves to Port #3, and the host is still assigned the same IP address. To handle this properly, and administrator must pre-configure the destination port with the VLAN, otherwise, the access to the network of the host gets lost due to missing or improper VLAN configuration. The Dynamic Switch Policy embodiment of the presently disclosed invention provides a solution to the problems associated with this scenario.

A second possible outcome is to choose to adopt the new host network and switch policies on the new port. For example, in a blade server system, if an administrator prefers to have a network policy persistent to the Chassis ID and Slot ID, when a blade server moves from one slot to another slot, the host network policy—such as an IP address associated with the new Slot ID—should be applied on the moved server. The IP address will change from what it was in the original port; it will change to an address that is dependent on the host network policy associated with the new port. Note that in this scenario, a port is always associated with the same IP address no matter what physical server is connected to it. Therefore, no matter what physical server connects to the specific port, the host will be assigned with the same IP address. This occurs because today's current technology uses DHCP with or without MAC address matching and is not able to provide the ability to adopt the new host network policy; it tends to keep the old host network policy or simply get a random host network policy. The Host Network Policy Control embodiment of the currently disclosed invention is a solution to these problems.

The third possible outcome of performing a Host ID Move is to adopt the new host network policy while migrating the Switch policy from the old port to the new port. There are two specific difficulties presented by this outcome that prevent this from becoming a common solution. First, one can choose to adopt the new host network policy, as today's technology usually associates the MAC address with the host network policy; the host Network Policy Control embodiment of the current invention, described above, provides a solution to this problem. The second difficulty we find is in migrating the switch policy from the old port to the new port's network policy; the Dynamic Switch Policy embodiment of the current invention, also previously described, provides a solution to this problem.

The final possible outcome of moving a physical or virtual host within a system to be discussed herein is keeping the old Host network policy while adopting the switch policy on the new port. This is the most common scenario with the technology available today, as the switch has nothing to do.

There are two possible outcomes if a physical ID is replaced on a port, such as when a Host ID is changed on a switch port. The first possible outcome is to keep the old host network policy. Although the MAC address changes, the IP address is kept persistent. Today, when the MAC address gets changed, the host network policy also gets changed. The IP address cannot stay unchanged when MAC address changes. The invention of the current disclosure solves this problem with the Host Network Policy Control embodiment. With the second scenario, one can adopt a new host network policy. Using this approach, the MAC address has changed so the DHCP server changes the IP address accordingly.

Both physical hosts and VMs use N+1 redundancy, which also present specific problems in handling moving resources. For example, in a blade system environment, when a server blade fails by itself, the redundant server will take over the host network policy and switch policy of the failed blade. For physical servers, the first problem is that the redundant server has different MAC address as the failed one. A DHCP server usually assigns a different host network policy when a MAC address changed. The second problem is that the switch policy that used to apply to the failed server does not migrate to the port connected to the redundant server. Using the Dynamic Switch Policy embodiment in combination with the Host Network Policy Control embodiment solves the N+1 redundancy problem for physical hosts, so that the switch policy of the failed server is migrated to the redundant server.

The VM handles redundancy in a slightly different manner. For instance, if the physical host for the VM is down, the redundant physical host will launch the VM. This presents a problem for the limitations of today's technology, as the VM infrastructure will simply resume the host network policy; however, the switch policy of the guest host of the VM does not migrate automatically. For a solution to the issues surrounding VMs, only the Dynamic Switch Policy embodiment of the present invention is needed.

BRIEF SUMMARY OF THE INVENTION

Disclosed is a network switch for switching digital packets from a source to a destination, said network switch comprising at least one source port for receiving an incoming packet from a source, at least one destination port as a destination for the packet, and at least one processing unit coupled to a memory storage device. Said processing unit and coupled memory storage device can detect that a host computer is removed from a first predetermined physical location of a circuit and that a host computer is installed into a second predetermined physical location of a circuit, or that a host computer in a first predetermined physical location has stopped functioning. They can also migrate switch policy and host network control policy information for the host located in the second predetermined physical location.

The construction and method of operation of the invention, however, together with additional objectives and advantages thereof will be best understood from the following description of specific embodiments when read in connection with the accompanying drawings.

Said network switch also provides a method for operating a computer network communications device comprising the following steps in any order: detecting a host computer is removed from a first predetermined physical location of a circuit; detecting the host computer is installed into a second predetermined physical location of a circuit; detecting that a host computer in a first predetermined physical location has stopped functioning; migrating switch policy information to the host located in the second predetermined physical location; and migrating a host network policy to a second host located in a second predetermined physical location wherein the network communications device routes packets to the second predetermined second physical location.

Also provided is a method of connecting a plurality of computers connected among each other, comprising the steps of: providing at least one network switch, adaptively changing at least one switch configuration and capability using a network switch; and providing an integral networking environment for computers in response to external or internal events. Said switch can be the local switch or a remote switch. The adaptive changes provided by the switch are migrating switch policies and host network policies from a first predetermined physical location of a circuit to a second predetermined physical location of a circuit in at least one switch; modifying the configuration of a second predetermined physical location of a circuit, referring to the configuration of the first predetermined physical location of a circuit; and migrating switch policies and host network policies from a first predetermined physical location of a circuit to a second predetermined physical location of a circuit, in multiple switches. Said external events are signals from devices other than the switch itself, or internal, recordable system information data of a switch, and are recorded on storage media therein.

A method is also provided for ensuring the persistency of network configurations of computers in association with DHCP servers, comprising the following steps in any order: persisting the IP address of the computer, persisting the IP address of the Domain Name Server of computers, persisting the IP address of the TFTP server which computers can download program from, and persisting the network configuration of computers using certain data in the switch and the DHCP server. Said certain data can be the port number of the switch, the MAC address of the computer, or other relevant data.

The presently disclosed invention also provides a method of adaptively changing the configuration and capability of at least one network-connected switch, providing an integral networking environment for computers in response to internal and external events in a system of computers, wherein said computers are connected among each other with at least one network switch. Said switch migrates switch policies and host network policies from a first predetermined physical location of a circuit to a second predetermined physical location of a circuit in one switch or in multiple switches. Said switch also switch modifies the configuration of a second predetermined physical location of a circuit, referring to the configuration of the first predetermined physical location of a circuit. Said external events are signals from devices other than the switch itself; internal events of a switch are system information kept by a switch, including such information as statistics items, temperature, time, SNMP MIB, SNMP trap and any other information kept by the switch.

In addition, the presently disclosed invention also provides a method wherein said network can be comprised of several host computers connected to a respective slot; said slots each connected to a respective port on a switch further comprising additional ports designed for receiving electronic signals from said network and through the use of the switch policy, directing the electronic signals to the appropriate host computer through the respective slots from their associated ports.

The presently disclosed invention also provides a method for keeping an old host network policy while migrating the switch policy from the old port to the new port comprising the following steps: beginning a Dynamic Switch Policy with either an internal trigger event generated through a means to detect when a network element fails to function as intended or alternatively an external trigger event generated by another network element; indicating said trigger events on the data plane and communicating to a control plane, embodied either in the switch or embodied externally to the switch, through a network Element Management System for triggering execution of the Dynamic Switch Policy; testing for loss of an element and addition of a new element; identifying the element as a replacement element and verifying against the known switch configuration; and setting the switch policy for the new element by migrating the policy for the element or creating a new policy for the particular port currently associated with the element. This method may include an embodiment wherein the Dynamic Switch Policy operates as designated Host #1 moves from designated Slot #1 to designated Slot #3; designated Port #3 detects that it is now resident in designated Slot #3; designated Port #3 next indicating to said switch control plane that designated Host #1 has moved; the switch policy from designated Port #1 is next migrated to become the new switch policy of designated Port #3 wherein all associated information, including ACLs, QOS and VLANs, are transferred. In addition, the host computer may be removed from a first slot of a switch and plugged into a second slot of the switch; the port information automatically shifted to the second slot (port) where the host computer is located. This method may also include an embodiment wherein after designated Host #1 is moved via a Host ID Move from designated Slot #1 to designated Slot #3, a DHCP request is created on designated Port #3 by the newly placed designated Host #1 that has just moved from designated Port #1 to designated Port #3; the request is next passed to the DHCP Relay, inserting information such as the Chassis and Slot ID into Option; the request is then moved to the DHCP Server, which sets its information on the IP address and DNS and TFTP servers for the host based on the information in an Option page view; the request is then sent back to the DHCP Relay, which passes it back to designated Host #1 in designated Slot #3 connected to designated Port #. Finally, said triggering event may also be a failed host computer.

Finally, a method of using certain data by both Switch and DHCP server to assign the network configuration to computers is also provided. Said network configurations can be IP address of the computer, IP address of the Domain Name Server, IP address of the TFTP server which computers can download program from, IP address of the Default Gateway of the computer and many other items that DHCP server supports. Said certain data can be port number of the switch, MAC address of the computer, and other relevant information.

DETAILED DESCRIPTION OF THE DRAWINGS

Figure 1:
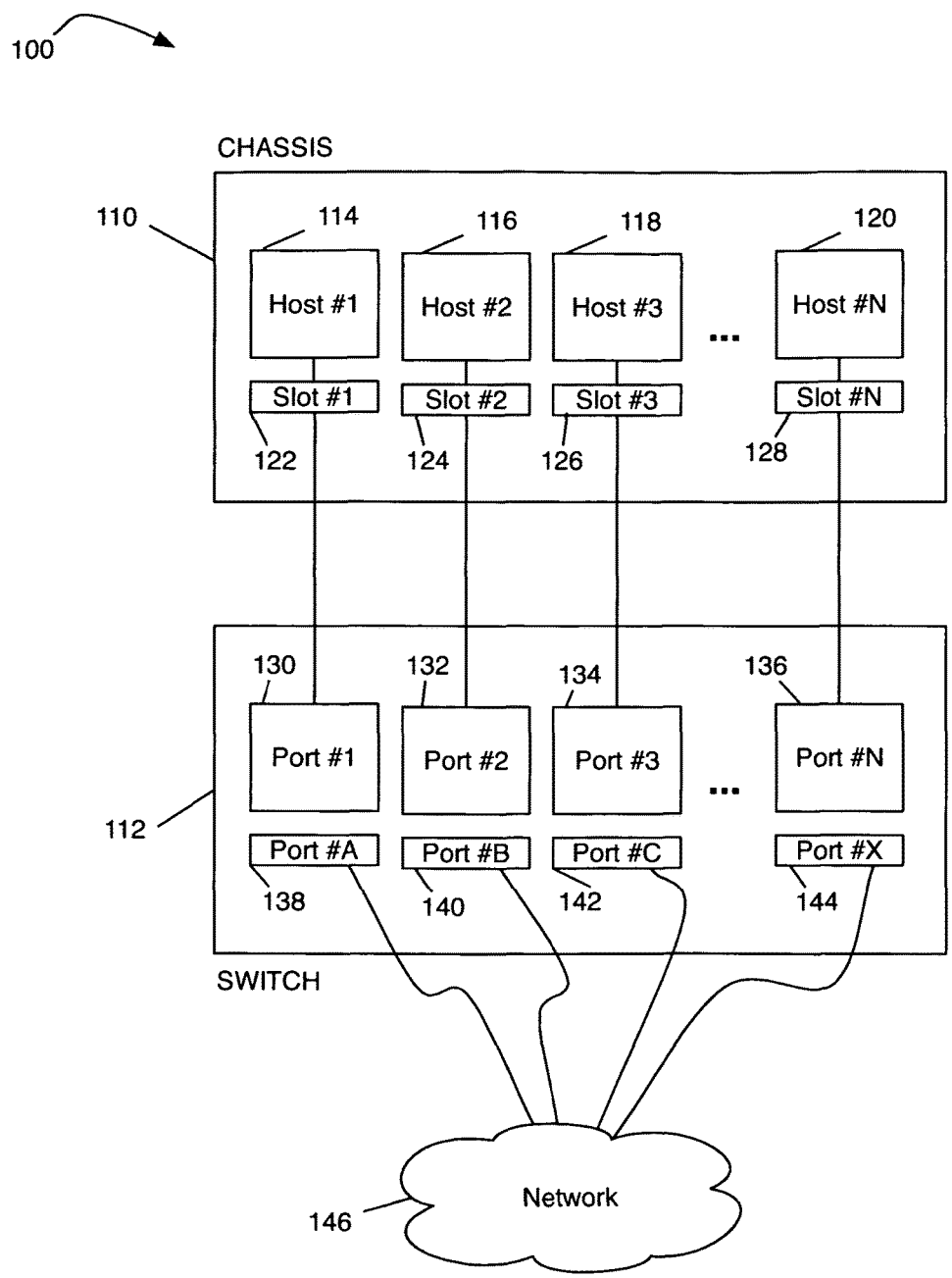
FIG. 1 shows a representation of a computer network with switching and several host computers.

The invention of the present disclosure solves many common problems in dealing with both switch and network policies for both physical and virtual host moves, replacements and redundancies. It is worth noting that the design and construction of computers and the hardware they comprise, as well as network communication protocols are all very well known in the art and therefore will not be discussed in detail here.

References in the specification to "one embodiment", "an embodiment", "an example embodiment", etc., indicate that the embodiment described may include a particular feature, structure or characteristic, but every embodiment may not necessarily include the particular feature, structure or characteristic. Moreover, such phrases are not necessarily referring to the same embodiment. Further, when a particular feature, structure or characteristic is described in connection with an embodiment, it is submitted that it is within the knowledge of one of ordinary skill in the art to effect such feature, structure or characteristic in connection with other embodiments whether or not explicitly described. Parts of the description are presented using terminology commonly employed by those of ordinary skill in the art to convey the substance of their work to others of ordinary skill in the art.

Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

FIG. 1 shows a representation of a general computer network with several network elements, specifically several host computers 114-120. The figure shows a chassis 110 having host computers Host #1 through Host #N (114-120) wherein each host computer is connected to a respective slot, Slot #1 through Slot #N (122-128). The slots 122-128 are each connected to a respective port on a switch 112, Ports #1 through Port #N (130-136). The switch in turn has a plurality of ports, Port #A through Port #X (138-144), connected to a network 146. Ports #A through X are for receiving electronic signals from the network 146 and, through the use of the switch policy, for directing the electronic signals to the appropriate host computer 114-120 through the respective slots 122-128 through from their associated ports 130-136.

Figure 2:
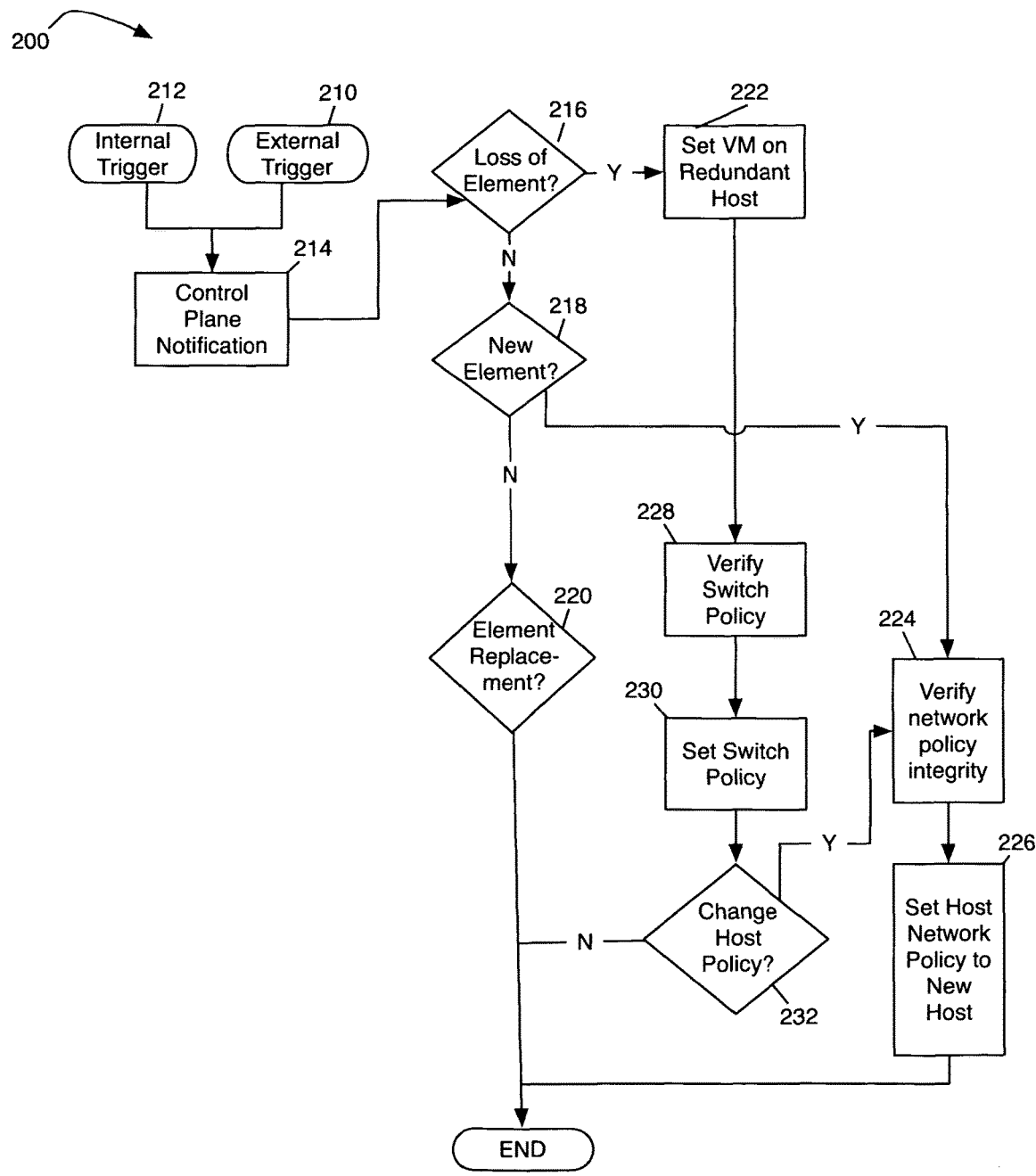
FIG. 2 illustrates a flowchart showing one embodiment of the current invention.

For the problems associated with keeping an old host network policy while migrating the switch policy from the old port to the new for whether a physical host or VM, with simply migrating any switch policy from one port to another or with handling N+1 redundancy issues for both physical hosts and VMs, the Dynamic Switch Policy embodiment of the presently disclosed invention provides a solution, as it automatically rolls over relevant policies. FIG. 2 illustrates the decision tree for many of the solutions provided by the invention of the current disclosure. The current aspect, a Dynamic Switch Policy, begins with either an internal trigger event 210 or alternatively an external trigger event 212. The internal trigger events may be generated through "fault ware" which is a means to detect when a network element fails to function as intended, or through an external trigger event generated by another network element. The trigger events are indicated on the data plane and communicated to the control plane 214 through a network Element Management System (EMS) for triggering execution of the Dynamic Switch Policy. The control plane may be embodied in the switch or may be embodied externally to the switch. This aspect of the current invention will test for loss of an element 216 and the addition of a new element 218 (described below). If the element is not identified as a replacement element 220, execution of the current embodiment ends. If the element is identified as a replacement element 220 the switch policy is verified 228 against the known switch configuration. Verification may be performed by identifying MAC address information from the data plane such that a host computer is being located in a different port will be detected. The switch policy is then set for the new element 230. Setting the switch policy may entail migrating the policy for the element or creating a new policy for the particular port the element is currently operating from. Sample code or pseudo code is part of the current switch code base and is attached at the bottom of this document.

This method described in FIG. 2 above can be implemented in a multiplicity of arrangements of computer program code. One such arrangement is a program code module that listens for certain messages in the control plane, such as a physical host being transferred from one slot to another. This necessitates the existence of a program code module to detect the presence and absence of a host in a physical slot connected to a port, and yet another to determine the status of the host resident in a slot connected to a port. To perform verifications, another program code module is need that identifies relevant information such as the MAC address and location from the switch data plane. Finally, another program code module would retrieve the switch policy from the host's port of origin, and yet another would write this to the destination port.

There must be sufficient communication between all program modules to pass information relevant to their execution. For instance, the information obtained by the code module that determines the switch policy of the original port must be communicated to the code module that writes the switch policy to the destination port.

Figure 3:
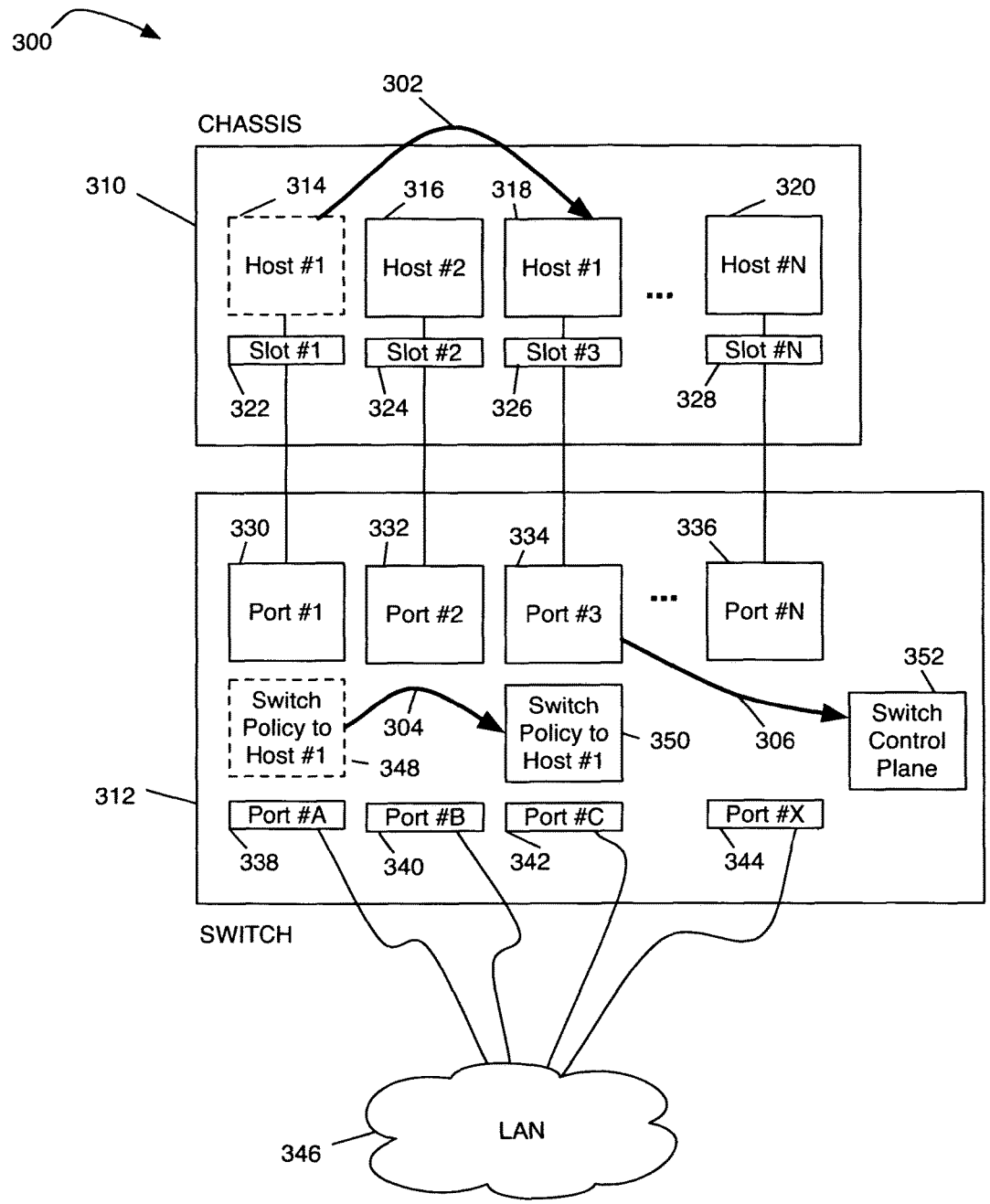
FIG. 3 illustrates the operation of the Dynamic Switch Policy embodiment of the current invention.

FIG. 3 shows how the Dynamic Switch Policy embodiment operates as Host #1 314 moves from Slot #1 322 to Slot #3 326, Port #3 334 detects that it is now resident in Slot #3 Port #3 334 then indicates 306 to the switch control plane 352 that Host #1 314 has moved. It is worth noting that the host can also migrate to a different slot in a remote switch. In this case, the switch control planes of the respective switches will communicate with each other to ensure seamless migration. Once the switch control plane 352 is notified, the switch policy 348 from Port #1 330 is migrated 304 to become the new switch policy 350 of Port #3 334. All associated information, such as ACLs, QOS and VLANs are transferred. Examples of such moves are physically moving a blade to another slot, and migrating a VM from one physical host to another.

This current embodiment of the invention disclosed herein allows for a host computer to be removed from a first slot of a switch and plugged into a second slot of the switch and the port information will automatically shift to the second slot (port) where the host computer is located. If the host computer has a null switch policy, then a null switch policy will also be set or migrated to the new port. A person having skill in the art would also appreciate that this embodiment may also be realized by having a host or proxy inform the switch about the change in location of a host computer.

One having skill in the art will appreciate that the current invention can be realized using conventional software tools for making machine instruction sets to effect the current invention. These may be embedded instructions encoded on a physical chipset for operation of a dedicated processor in the control plane or instructions in a dynamic memory for operation of a processor to manage the control plane or a combination thereof.

Another solution provided by the current invention solves the problems associated with adopting both the new host network and the switch policies on a port after a physical host or VM move, with performing a Host ID Change on a switch port, and with providing seamless N+1 redundancy for physical hosts by migrating or persisting a host network policy. The Host Network Policy Control embodiment automatically controls certain parameters for the host computer including, but not limited to, the IP address of the host, its DNS server and TFTP server. Referring to FIG. 1, in this embodiment, if the Host #1 computer 114 is moved from Slot #1 122 to Slot #3 126 in the chassis 110, the switch 112 will check if the Host Network Policy Control embodiment will maintain the network policy of the Host # 1 computer 114, and if so, the switch 112 will dynamically add Port #3 134 into the VLAN to insure that the serviceability of the Host #1 computer 114 across the network 146 remains intact.

Figure 4:
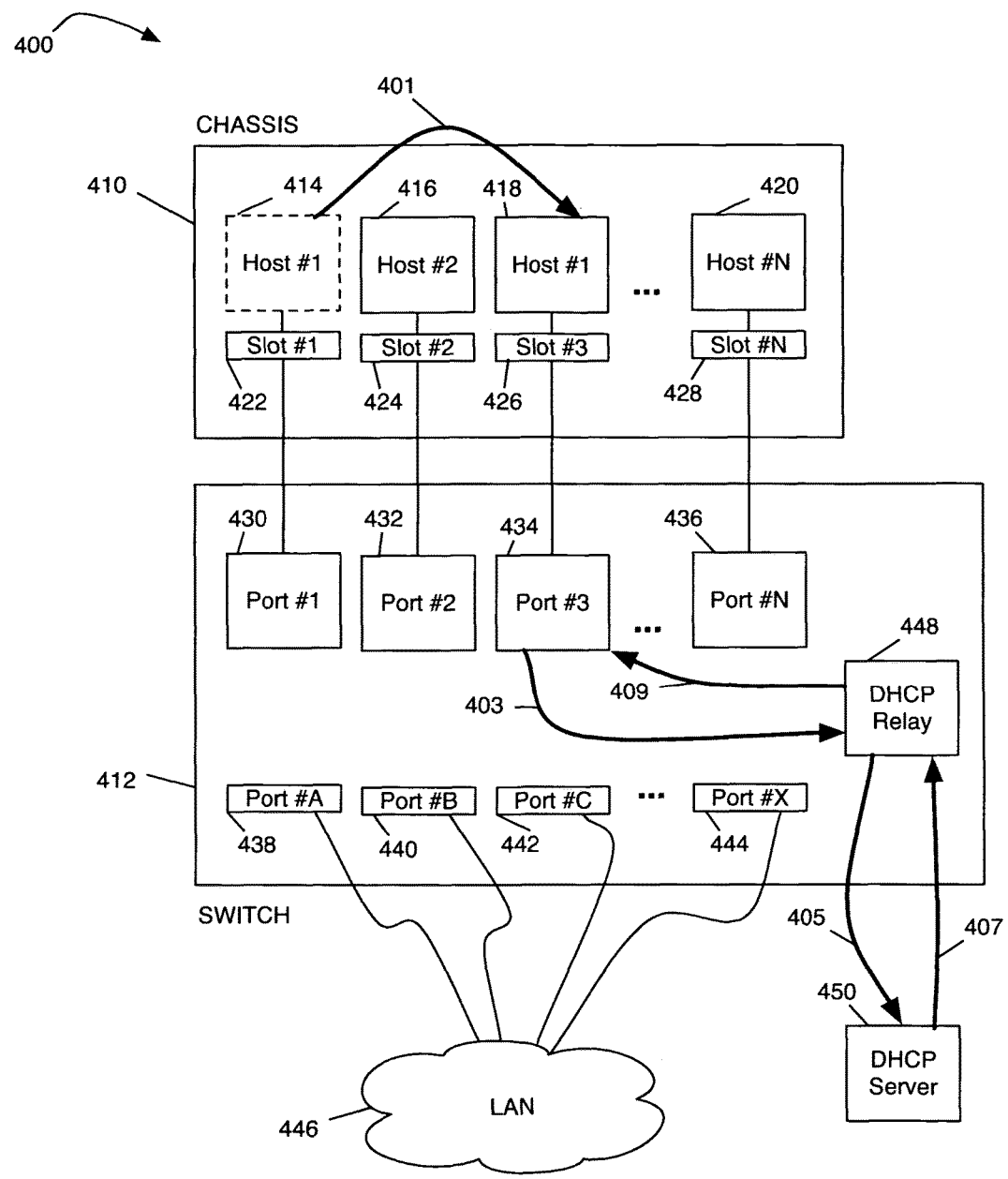
FIG. 4 shows the operation of the Host Network Policy Control embodiment of the current invention.

To further illustrate, FIG. 4 shows how, after a Host ID Move 401, of Host #1 414 in Slot #1 422 to Slot #3 426, a DHCP request is created on Port #3 434 by the newly placed Host #1 418 that has just moved from Port #1 422 to Port # 3 434. The request is passed to the DHCP Relay 448, which will insert information such as the Chassis and Slot ID into Option 82. The request then goes to the DHCP Server 450, which will set its information on the IP address and DNS and TFTP servers for the host based on the information in Option 82. The request is then sent back to the DHCP Relay 448, which passes it back to Host #1 418 in Slot #3 426 connected to Port #3 434.

The operation of this aspect of the current invention is illustrated in the flowchart of FIG. 2, and begins with either an internal trigger event 210 or alternatively an external trigger event 212 as described above. The trigger events are indicated on the data plane and communicated to the control plane 214 through an EMS for triggering the execution of the host network policy. After identifying the aspect is a replacement element 220 and verifying 228 and migrating the switch policy 230, the host network policy may be persisted for the host machine 232.

Persisting the host policy entails the additional steps of verifying the network host policy 224 wherein the host policy is configured on the switch element. The host network policy is then set for the host computer 226. This operates, as described above, by having a DHCP relay insert the content such as chassis ID and slot Id into option 82 and having the DHCP server assign the appropriate network settings such as IP address, TFTP server on the content for option 82.

The method described in FIG. 2 and FIG. 4 above can be implemented in a multiplicity of arrangements of computer program code. One possible arrangement is a program code module that listens for certain messages in the control plane, for instance, when a physical host is transferred from one slot to another. In this instance, a program code module is required to detect the presence and absence of a host in a physical slot connected to a port, and yet another to determine the status of the host resident in a slot connected to a port. To perform verifications, another program code module is need that identifies relevant information such as the MAC address and location from the switch data plane. Program code modules are also required to handle the information in Option 82 as described. A module is required which can write a DHCP request, followed by code that can parse a request, and the parameters within Option 82 of the request as it is returned from the DHCP server. Another program code module would retrieve the host network policy from the host's port of origin, and yet another would write this to the destination port, and still more would do the same for retrieving and writing the switch policy. Finally, computer program code modules to verify that the existing host network policy will maintain the element's availability and serviceability, as well as program code modules to configure VLANs.

There must be sufficient communication between all program modules to pass information relevant to their execution. For instance, the information obtained by the code module that identifies the MAC address of a host must be communicated to the code module verifies that the existing host network policy will maintain the element's serviceability.

It will be apparent to someone with skill in the art that the operation of the current embodiment may also operate between multiple switches. For example, if more than one switch detects a change in host computers, the switch policy migration information will be sent between the host computers using one of several possible protocols either independently or in combination with code 82. This would constitute an external trigger event 210. If the switch policy of Port #X on a first switch migrates to Port #Y on a second switch then the first switch will communicate with the second switch the switch policy of Port #X. The second switch will then configure Port #Y accordingly to the received policy.

Figure 5:
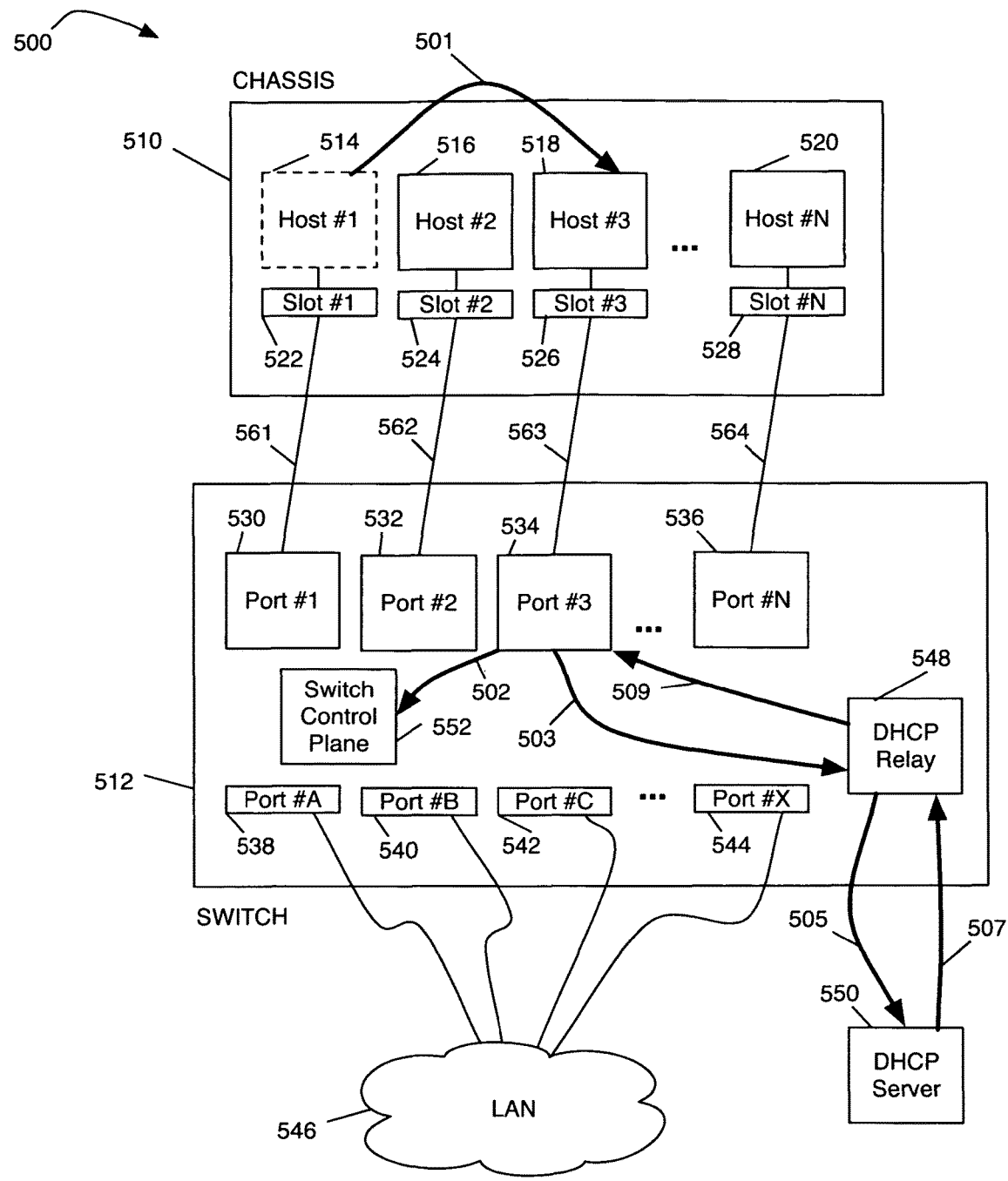
FIG. 5 depicts the failover embodiment of the currently disclosed invention.

In yet another embodiment of the current invention, a server fails and a redundant server takes over the host network policy and the switch policy from the failed server. Referring to FIG. 5, Host # 1 514 positioned in Slot #1 122 fails. A second computer, located in Slot #3 526, is configured to act as a redundant server 501 to Host #1 514. Port #3 534 in the switch 512 detects the failure and brings down the link 561 between Slot #1 522 and Port #1 530. The switch then brings up the link 563 between Slot #3 526 and Port #3 534. The switch 512, having detected that Host #1 514 failed, migrates the switch policy from Port #1 530 to Port #3 534 and indicates 502 to the switch control plane 552 that the failover occurred. Likewise, the switch 512 will check if the host network policy control will maintain the network policy of Host #1 514, and if so, the switch 512 will dynamically add Port #3 534 into the VLAN to insure the serviceability of the failed Host #1 computer 514 on the Host #3 computer 518. After the failover, Host #3 518 issues a DHCP request which is forwarded 506 through Port #3 534 to the DHCP Relay 548, which will insert information such as the Chassis and Slot ID into Option 82. The request then goes to the DHCP Server 550, which will set its information on the IP address and DNS and TFTP servers for the host based on the information in Option 82. The request is then sent back to the DHCP Relay 548, which passes it back to Host #1 518 in Slot #3 526 connected to Port #3 534.

Following the flowchart of FIG. 2 to illustrate the "failover" aspect of the current invention, we begin as before with either an internal trigger event 210 or alternatively an external trigger event 212 as described above. In this case, the trigger is a failed host computer. The trigger events are indicated on the data plane and communicated to the control plane 214 through a network EMS for triggering execution of the dynamic switch policy. If there is a loss of an element 216 such as a host computer, the switch brings down the link to the failed computer and establishes a link to the redundant host in a conventional failover process. Once the link is established, the VM is established on the redundant host computer 222. Then the switch policy is verified 228 against the known switch configuration. The switch policy is then set for the new element 230. Setting the switch policy may entail migrating the policy for the element or creating a new policy for the particular port the element is currently operating from. Once the switch policy is set for the host computer, the network host policy is established by persisting the host policy from the failed host computer. The host network policy is verified 224 and then set for the host computer 226. This operates by having a DHCP relay insert the content such as chassis ID and slot Id into option 82 and having the DHCP server assign the appropriate network settings such as IP address, TFTP server on the content for option 82.

The method described in FIG. 2 and FIG. 4 above can be implemented in a multiplicity of arrangements of computer program code. One possible arrangement is a program code module that listens for certain messages in the control plane, for instance, when a physical host is transferred from one slot to another. In this instance, a program code module is required to detect the failure of a host in a physical slot connected to a port. Next, program code modules to bring down physical links to a port from a slot with and to establish links from ports slots with redundant hosts are required. The successful operation of these program modules necessitates the existence of yet another program code module that determines the appropriate redundant host. Another module that effects the establishment of a redundant host's newly instantiated VM is also required.

To perform verifications, another program code module is need that identifies relevant information such as the MAC address and location from the switch data plane. Program code modules are also required to handle the information in Option 82 as described. A module is required which can write a DHCP request, followed by code that can parse a request, and the parameters within Option 82 of the request as it is returned from the DHCP server. Another program code module would retrieve the host control policy from the host's port of origin, and yet another would write this to the destination port, and still more would do the same for retrieving and writing the switch policy. A program code module for creating a new switch policy for a particular port is also required. Finally, computer program code modules to verify that the existing host network policy will maintain the element's availability and serviceability, as well as program code modules to configure VLANs.

There must be sufficient communication between all program modules to pass information relevant to their execution. For instance, the information obtained by the code module that detects that a certain element has failed must be communicated to the code module that establishes a VM on the proper redundant host.

One having skill in the art will appreciate that the current invention can be used when there are other network element changes. The type of changes include, but are not limited to, changing a physical ID on a switch port, a VM moves form one port to another port or a VM is replaced on a physical host.

Figure 6:
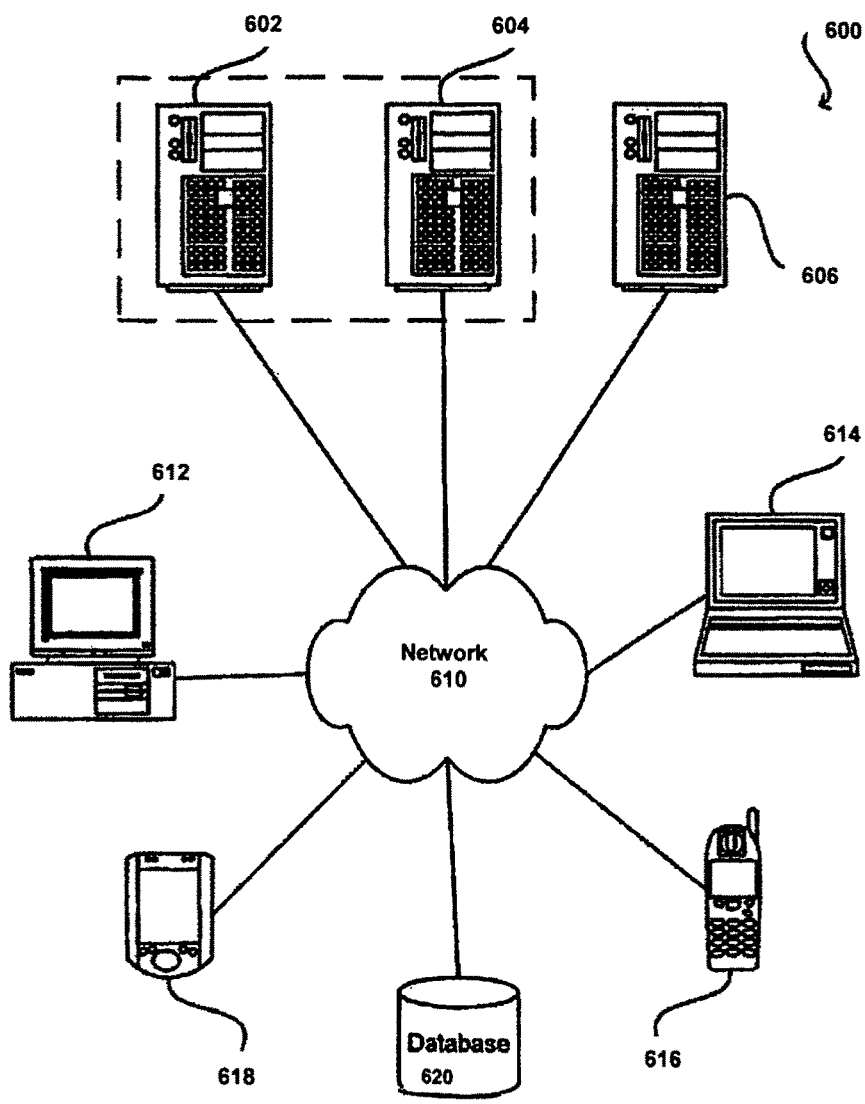
FIG. 6 shows a block diagram illustrating components of an exemplary operating environment.

Exemplary Operating Environments, Components, and Technology FIG. 6 is a block diagram illustrating components of an exemplary operating environment in which various embodiments of the present invention may be implemented. The system 600 can include one or more user computers, computing devices, or processing devices 612, 614, 616, 618, which can be used to operate a client, such as a dedicated application, web browser, etc. The user computers 612, 614, 616, 618 can be general purpose personal computers (including, merely by way of example, personal computers and/or laptop computers running a standard operating system), cell phones or PDAs (running mobile software and being Internet, e-mail, SMS, Blackberry, or other communication protocol enabled), and/or workstation computers running any of a variety of commercially-available UNIX or UNIX-like operating systems (including without limitation, the variety of GNU/Linux operating systems). These user computers 612, 614, 616, 618 may also have any of a variety of applications, including one or more development systems, database client and/or server applications, and Web browser applications. Alternatively, the user computers 612, 614, 616, 618 may be any other electronic device, such as a thin-client computer, Internet-enabled gaming system, and/or personal messaging device, capable of communicating via a network (e.g., the network 610 described below) and/or displaying and navigating Web pages or other types of electronic documents. Although the exemplary system 600 is shown with four user computers, any number of user computers may be supported.

In most embodiments, the system 600 includes some type of network 610. The network can be any type of network familiar to those skilled in the art that can support data communications using any of a variety of commercially-available protocols, including without limitation TCP/IP, SNA, IPX, AppleTalk, and the like. Merely by way of example, the network 610 can be a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 602.11 suite of protocols, GRPS, GSM, UMTS, EDGE, 2G, 2.5G, 3G, 4G, Wimax, WiFi, CDMA 2000, WCDMA, the Bluetooth protocol known in the art, and/or any other wireless protocol); and/or any combination of these and/or other networks.

The system may also include one or more server computers 602, 604, 606 which can be general purpose computers, specialized server computers (including, merely by way of example, PC servers, UNIX servers, mid-range servers, mainframe computers rack-mounted servers, etc.), server farms, server clusters, or any other appropriate arrangement and/or combination. One or more of the servers (e.g., 606) may be dedicated to running applications, such as a business application, a Web server, application server, etc. Such servers may be used to process requests from user computers 612, 614, 616, 618. The applications can also include any number of applications for controlling access to resources of the servers 602, 604, 606.

The Web server can be running an operating system including any of those discussed above, as well as any commercially-available server operating systems. The Web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 612, 614, 616, 618. As one example, a server may execute one or more Web applications. The Web application may be implemented as one or more scripts or programs written in any programming language, such as Java®, C, C# or C++, and/or any scripting language, such as Perl, Python, or TCL, as well as combinations of any programming/scripting languages. The server(s) may also include database servers, including without limitation those commercially available from Oracle®, Microsoft®, Sybase®, IBM® and the like, which can process requests from database clients running on a user computer 612, 614, 616, 618.

The system 600 may also include one or more databases 620. The database(s) 620 may reside in a variety of locations. By way of example, a database 620 may reside on a storage medium local to (and/or resident in) one or more of the computers 602, 604, 606, 612, 614, 616, 618. Alternatively, it may be remote from any or all of the computers 602, 604, 606, 612, 614, 616, 618, and/or in communication (e.g., via the network 610) with one or more of these. In a particular set of embodiments, the database 620 may reside in a storage-area network ("SAN") familiar to those skilled in the art. Similarly, any necessary files for performing the functions attributed to the computers 602, 604, 606, 612, 614, 616, 618 may be stored locally on the respective computer and/or remotely, as appropriate. In one set of embodiments, the database 620 may be a relational database, such as Oracle 10 g that is adapted to store, update, and retrieve data in response to SQL-formatted commands.

Figure 7:
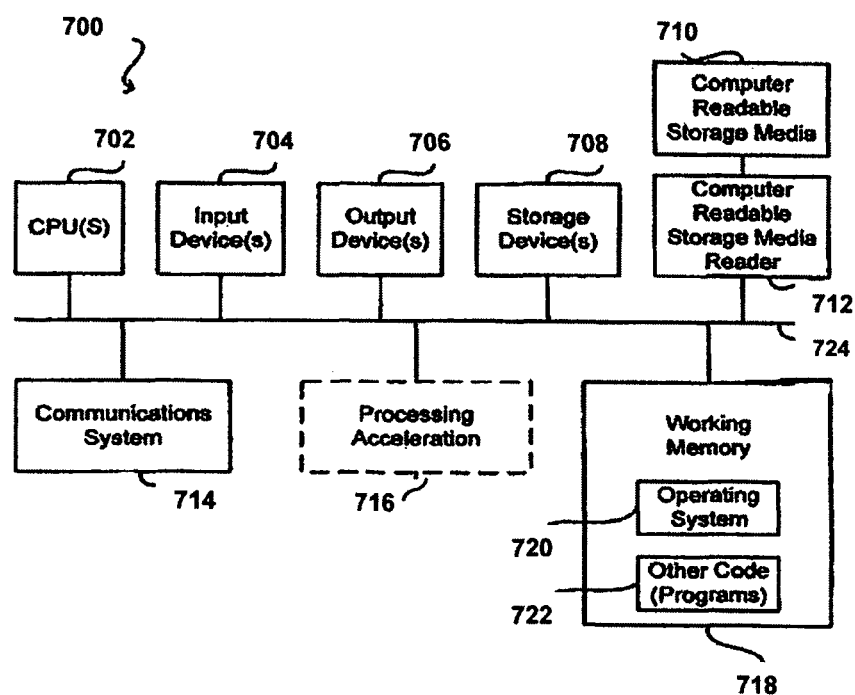
FIG. 7 illustrates an exemplary computer system in which various embodiments of the present invention may be implemented.

FIG. 7 illustrates an exemplary computer system 700, in which various embodiments of the present invention may be implemented. The system 700 may be used to implement any of the computer systems described above. The computer system 700 is shown comprising hardware elements that may be electrically coupled via a bus 724. The hardware elements may include one or more central processing units (CPUs) 702, one or more input devices 704 (e.g., a mouse, a keyboard, etc.), and one or more output devices 706 (e.g., a display device, a printer, etc.). The computer system 700 may also include one or more storage devices 708. By way of example, the storage device(s) 708 can include devices such as disk drives, optical storage devices, solid-state storage device such as a random access memory ("RAM") and/or a read-only memory ("ROM"), which can be programmable, flash-updateable and/or the like.

The computer system 700 may additionally include a computer-readable storage media reader 712, a communications system 714 (e.g., a modem, a network card (wireless or wired), an infra-red communication device, etc.), and working memory 99, which may include RAM and ROM devices as described above. In some embodiments, the computer system 700 may also include a processing acceleration unit 716, which can include a digital signal processor DSP, a special-purpose processor, and/or the like.

The computer-readable storage media reader 712 can further be connected to a computer-readable storage medium 710, together with (and, optionally, in combination with storage device(s) 708) comprehensively representing remote, local, fixed, and/or removable storage devices plus storage media for temporarily and/or more permanently containing, storing, transmitting, and retrieving computer-readable information. The communications system 714 may permit data to be exchanged with the network and/or any other computer described above with respect to the system 700.

The above illustrations provide many different embodiments or embodiments for implementing different features of the invention. Specific embodiments of components and processes are described to help clarify the invention. These are, of course, merely embodiments and are not intended to limit the invention from that described in the claims.

Although the invention is illustrated and described herein as embodied in one or more specific examples, it is nevertheless not intended to be limited to the details shown, since various modifications and structural changes may be made therein without departing from the spirit of the invention and within the scope and range of equivalents of the claims. Accordingly, it is appropriate that the appended claims be construed broadly and in a manner consistent with the scope of the invention, as set forth in the following claims.

What is claimed is:

1. A network switch system comprising:
   at least one source port for receiving a packet from a source;
   at least one destination port as a destination for the packet;
   at least one processing unit coupled to a memory storage device; and
   program instructions, stored on the memory storage device for execution by the at least one processing unit to:
   detect that a first host computer is removed from a first predetermined physical location of a circuit, said first host computer associated with a switch policy comprising simple network management protocol simple network protocol traps, a first quality of access level, a first quality of service level and a first access control list;
   detect that a second host computer, different from the first host computer, is installed into a second predetermined physical location of the circuit different from the first predetermined physical location of the first host computer;

provide an adaptive change of at least one switch configuration by migrating said switch policy associated with the first host computer to the second host computer located in the second predetermined physical location, wherein said second host computer receives and becomes associated with said switch policy comprising the simple network management protocol, the simple network protocol traps, the first quality of access level, the first quality of service level, and the first access control list; and verify the migrated switch policy against the at least one switch configuration by identifying MAC address information corresponding to the second physical location of the circuit.

2. The network switch system of claim 1, wherein said switch policy further includes statistics items temperature, time, and a management information base.

3. The network switch system of claim 1, wherein the program instructions migrate a host network policy from said first host computer to said second host computer.

4. A method for operating a computer network communications device comprising:

detecting a host computer of a server farm is removed from a first predetermined physical location of a circuit, said first host computer in communication with a network switch having a switch policy comprising simple network management protocol, simple network protocol traps, a first quality of access level, a first quality of service level and a first access control list;

detecting a second host computer, different from the first computer, of the server farm is installed into a second predetermined physical location, different from the first predetermined location, of the circuit;

providing, by the network switch, an adaptive change of a switch configuration of the network switch by migrating said switch policy from the first host computer to the second host computer located in the second predetermined physical location, said second host computer, receiving and becoming associated with said switch policy comprising the simple network management protocol, the simple network protocol traps, the first quality of access level, the first quality of service level, and the first access control list, migrating a host network policy to the second host computer located in the second predetermined physical location, and verifying the migrated switch policy against the switch configuration by identifying MAC address information corresponding to the second physical location of the circuit.

5. The method of claim 4, wherein the network switch is a remote switch.

6. The method of claim 4, wherein the network switch provides an adaptive change of modifying a second configuration of the second predetermined physical location of the circuit, referring to a first configuration of the first predetermined physical location of a circuit.

7. The method of claim 4, wherein a change in host configuration of the server farm triggers said switch policy whereby the network switch detects the change.

* * * * *